United States Patent [19]
Kohno et al.

[11] Patent Number: 5,999,324
[45] Date of Patent: Dec. 7, 1999

[54] OPTICAL SYSTEM FOR FOCUSING AN OBJECT UP ON AN IMAGE SURFACE OF A SOLID-STATE IMAGE DEVICE

[75] Inventors: Tetsuo Kohno, Ioyonaka; Takashi Okada, Osaka; Hideki Nagata, Sakai, all of Japan

[73] Assignee: Minolta Co., Ltd., Osaka, Japan

[21] Appl. No.: 08/868,599

[22] Filed: Jun. 4, 1997

[30] Foreign Application Priority Data

Jun. 7, 1996 [JP] Japan ................................. 8-146061
Jun. 7, 1996 [JP] Japan ................................. 8-146063
Jun. 7, 1996 [JP] Japan ................................. 8-146065

[51] Int. Cl.$^6$ ............................. G02B 27/10; G02B 9/00; G02B 13/04
[52] U.S. Cl. ......................... 359/618; 359/740; 359/750
[58] Field of Search ........................... 389/740; 359/760, 359/759, 749–752, 693, 618

[56] References Cited

U.S. PATENT DOCUMENTS 4,482,218 11/1984 Tanaka ................................. 350/427
5,331,465 7/1994 Miyano ................................. 359/693

FOREIGN PATENT DOCUMENTS 6-331891 12/1994 Japan .

*Primary Examiner*—Georgia Epps
*Assistant Examiner*—Michael A Lucas
*Attorney, Agent, or Firm*—Sidley & Austin

[57] ABSTRACT

An optical system focuses an object upon an image surface of a solid-state image device. The optical system has a master optical system and a condenser lens. The master optical system and the condenser lens both have positive optical power. The focusing optical system fulfills the following conditions:

$$\frac{a}{Y'} < 5.0, \quad \left|\frac{b}{a}\right| < 2.0$$

where
  a represents the distance between the exit pupil of the master optical system and the image surface;
  b represents the distance between the exit pupil of the entire optical system and the image surface; and Y' represents the maximum image height.

20 Claims, 13 Drawing Sheets

FNO=4.50

— d
----- SC

-0.2   0.2
SPHERICAL  SINE
ABERRATION CONDITION

Y'=3.1

----- DM
—— DS

-0.2   0.2
ASTIGMATISM

Y'=3.1

-5.0   5.0
DISTORTION %

FNO=3.50

—— d
---- SC

-0.2    0.2
SPHERICAL  SINE
ABERRATION CONDITION

Y'=3.1

---- DM
—— DS

-0.2    0.2
ASTIGMATISM

Y'=3.1

-5.0    5.0
DISTORTION %

FNO=3.10

―― d
---- SC

-0.2  0.2
SPHERICAL  SINE
ABERRATION CONDITION

Y'=3.1

---- DM
―― DS

-0.2  0.2
ASTIGMATISM

Y'=3.1

-5.0  5.0
DISTORTION %

OPTICAL SYSTEM FOR FOCUSING AN OBJECT UP ON AN IMAGE SURFACE OF A SOLID-STATE IMAGE DEVICE

BACKGROUND OF THE INVENTION

1. Field of the Invention

The present invention relates to a taking optical system. More particularly, the present invention relates to a compact taking optical system suitable for use in a camera provided with a solid-state image device.

2. Description of the Prior Art

In a camera (for example, video camera or television camera) that shoots an object by directing a light beam incoming through a taking optical system to a solid-state image device such as a CCD (charge-coupled device) consisting of an array of light-sensing devices, a condensing microlens is provided on the light-receiving side of each of the light-sensing device to enhance its light-receiving efficiency. To make the most of the light-condensing ability of the microlenses, conventional taking optical systems are designed to have their exit pupil substantially at infinity (i.e. designed as an optical system that is substantially telecentric toward the image side). This is because, if a taking optical system has its exit pupil substantially at infinity, even an off-axial light beam strikes the light-sensing devices from a direction substantially perpendicular to the light-receiving surfaces of the light-sensing devices, and thus it is possible to make the most of the light-condensing ability of the microlenses.

The recent trend toward more compact cameras has been creating the need for taking optical systems having shorter overall lengths. However, as taking optical systems are made shorter, their exit pupil inevitably comes closer to the image surface; as the exit pupil comes closer to the image surface, the angle at which an off-axial light beam strikes the microlenses disposed at the periphery of an image deviates more from a right angle with respect to the light-receiving surfaces of the light-sensing devices. As a result, the light-condensing ability of the microlenses is impaired at the periphery of the image, and thus images shot by the solid-state image device suffer from uneven brightness between their central and peripheral portions. As described above, conventional taking optical systems are imperfect because, in them, it is not possible to reduce the overall length with the exit pupil placed at a substantially infinite position.

SUMMARY OF THE INVENTION

An object of the present invention is to provide a taking optical system that has a relatively short overall length despite having its exit pupil substantially at infinity.

To achieve the above object, according to one aspect of the present invention, an optical system for focusing an object upon an image surface of a solid-state image device is provided with a master optical system having positive optical power, and a condenser lens having positive optical power and provided between the master optical system and the image surface of the solid-state image device. In addition, in this optical system, the following conditions are fulfilled:

$$\frac{a}{Y'} < 5.0$$

$$\left|\frac{b}{a}\right| < 2.0$$

where
a represents a distance between an exit pupil of the master optical system and the image surface;
b represents a distance between an exit pupil of the entire optical system and the image surface; and
Y' represents a maximum image height.

According to another aspect of the present invention, an optical system for focusing an object upon an image surface of a solid-state image device is provided with a master optical system having positive optical power, and a condenser lens having positive optical power and provided between the master optical system and the image surface of the solid-state image device. In addition, in this optical system, the following condition is fulfilled:

$$1.8 < \left|\frac{b}{a}\right|$$

where
a represents a distance between an exit pupil of the master optical system and the image surface; and
b represents a distance between an exit pupil of the entire optical system and the image surface.

According to still another aspect of the present invention, an optical system for focusing an object upon an image surface of a solid-state image device is provided with a master optical system having positive optical power, and a condenser lens having positive optical power and provided between the master optical system and the image surface of the solid-state image device. In addition, in this optical system, the following conditions are fulfilled:

$$6.7 < \frac{a}{Y'}$$

$$\left|\frac{b}{a}\right| < 2.0$$

where
a represents a distance between an exit pupil of the master optical system and the image surface;
b represents a distance between an exit pupil of the entire optical system and the image surface; and
Y' represents a maximum image height.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
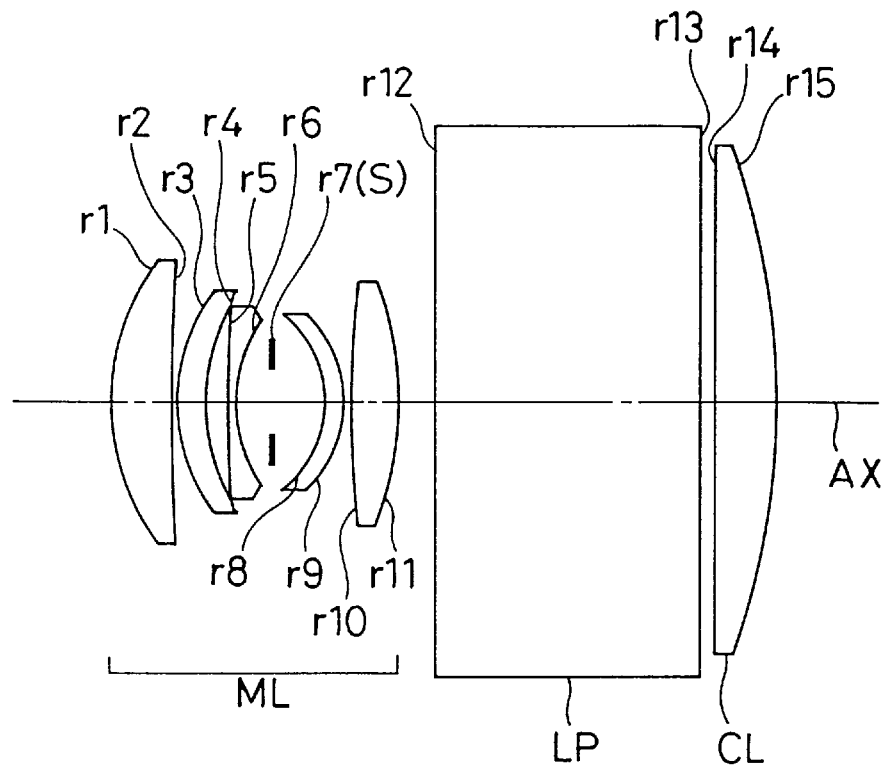
FIG. 1 is a diagram showing the lens construction of the taking optical system of a first embodiment of the present invention.
Figure 2A:
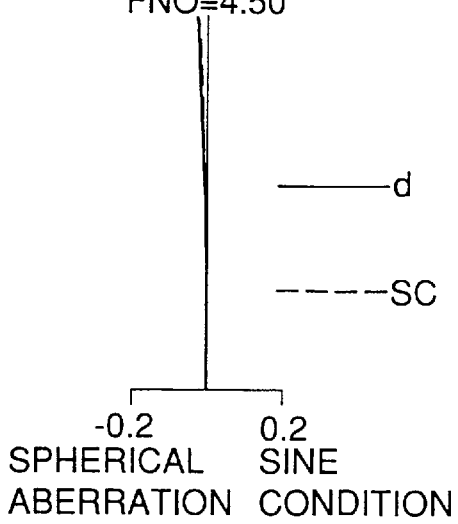
FIGS. 2A to 2C are diagrams showing the aberrations observed in the first embodiment.
Figure 2B:
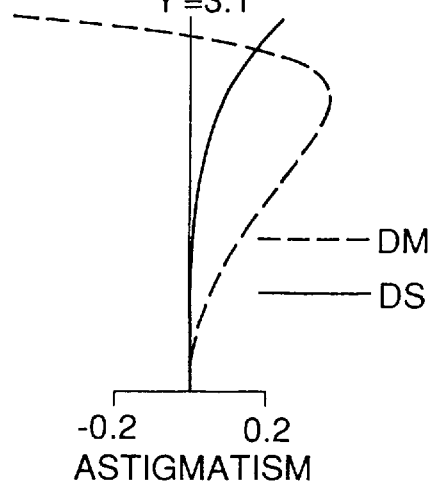
Figure 2C:
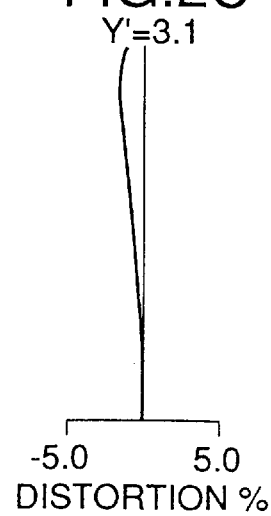
Figure 3:
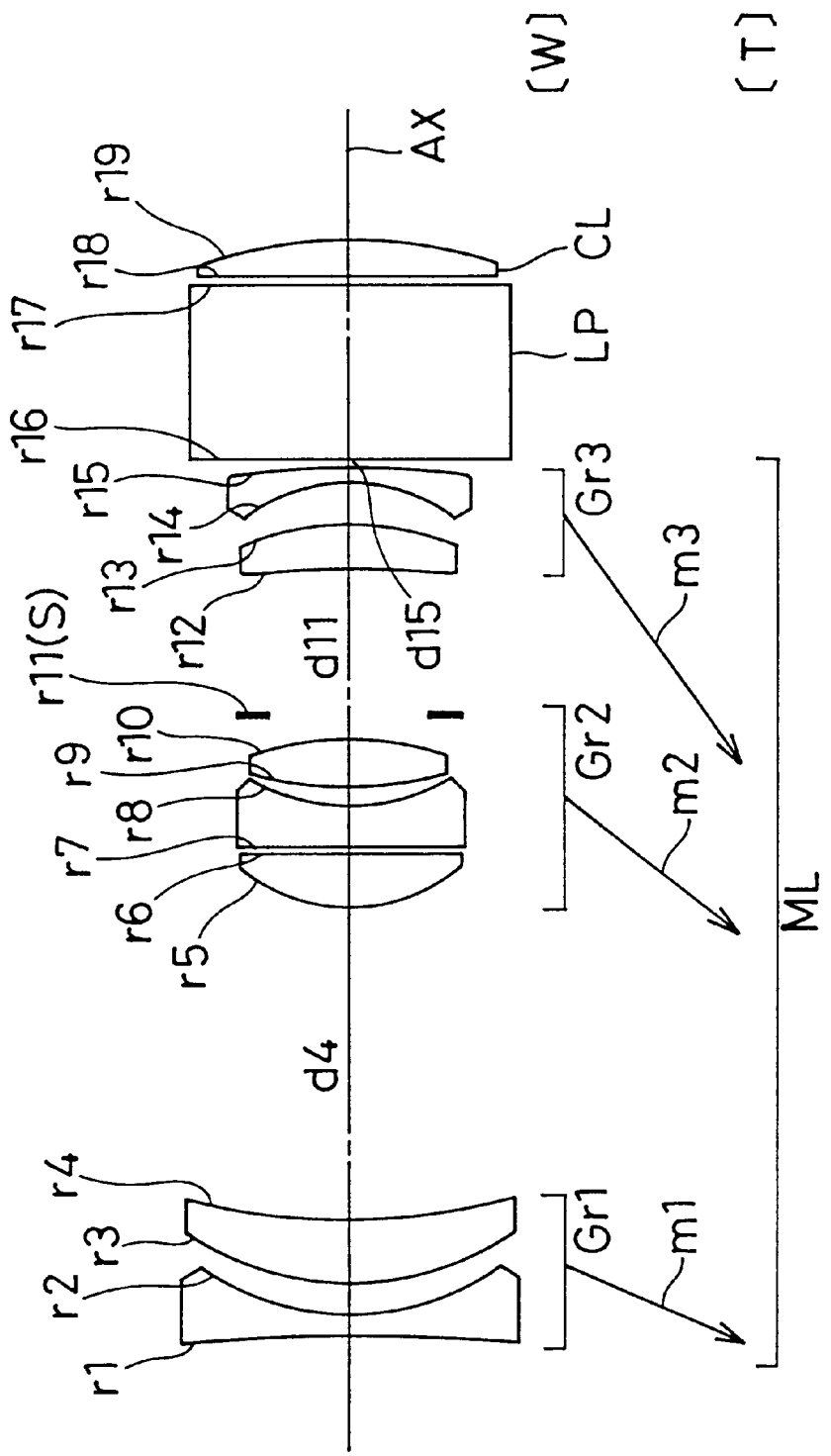
FIG. 3 is a diagram showing the lens construction of the taking optical system of a second embodiment of the present invention.
Figure 4:
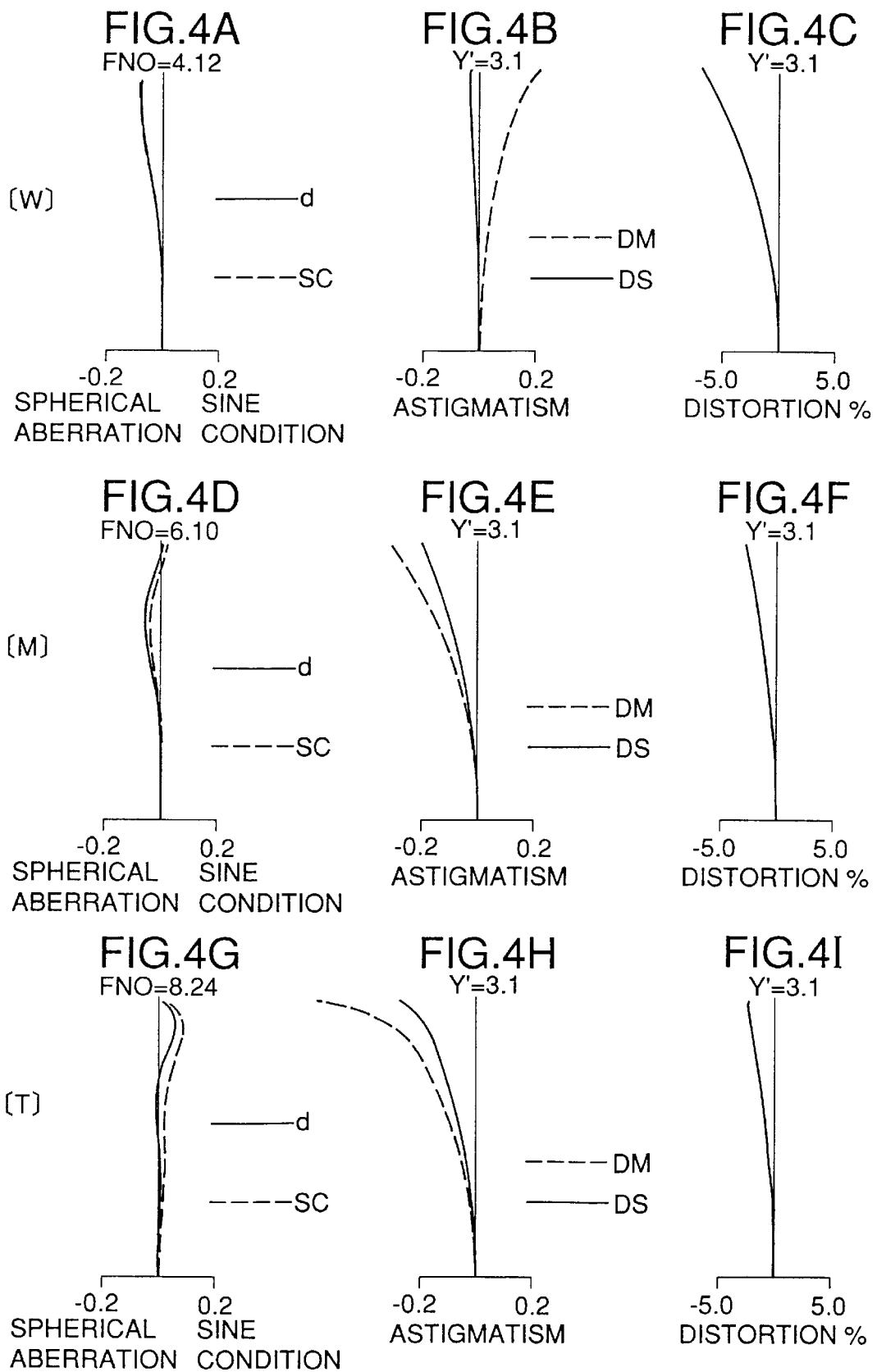
FIGS. 4A to 4I are diagrams showing the aberrations observed in the second embodiment.
Figure 5:
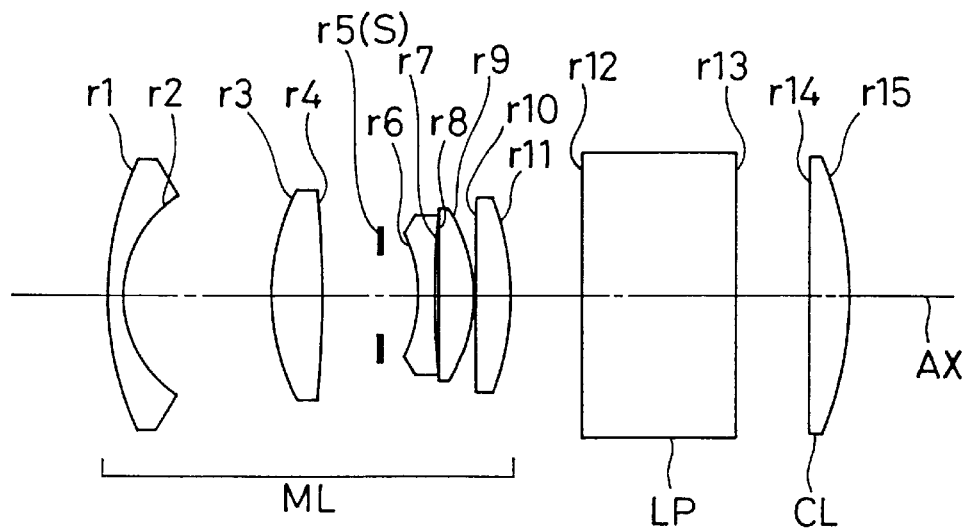
FIG. 5 is a diagram showing the lens construction of the taking optical system of a third embodiment of the present invention.
Figure 6A:
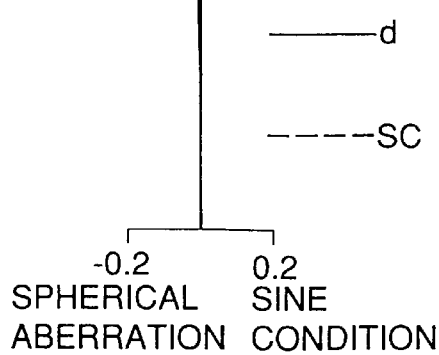
FIGS. 6A to 6C are diagrams showing the aberrations observed in the third embodiment.
Figure 6B:
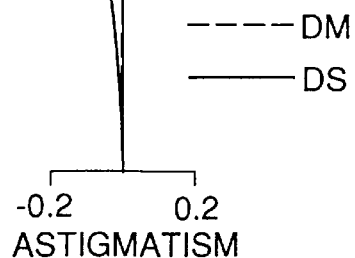
Figure 6C:
Figure 7:
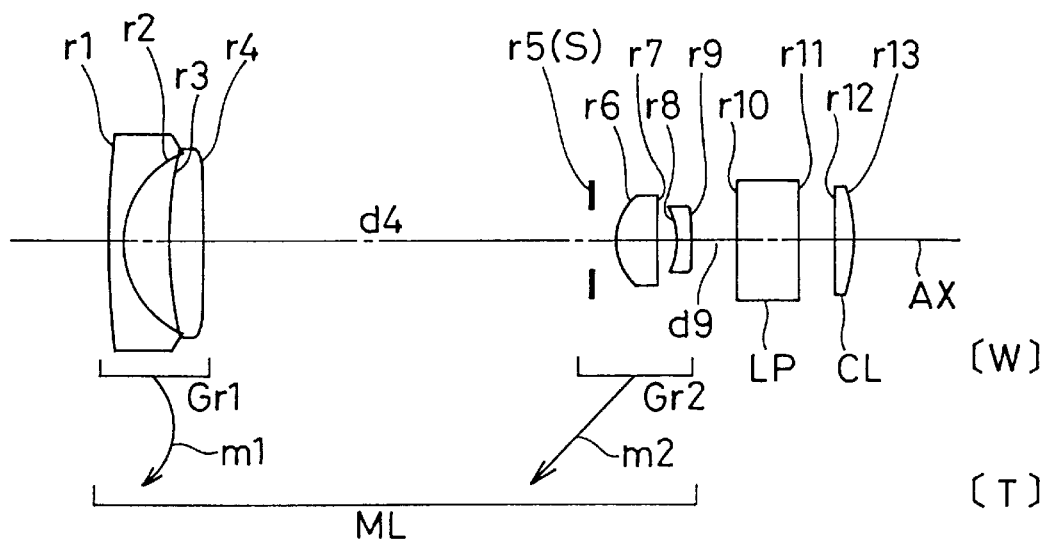
FIG. 7 is a diagram showing the lens construction of the taking optical system of a fourth embodiment of the present invention.
Figure 8:
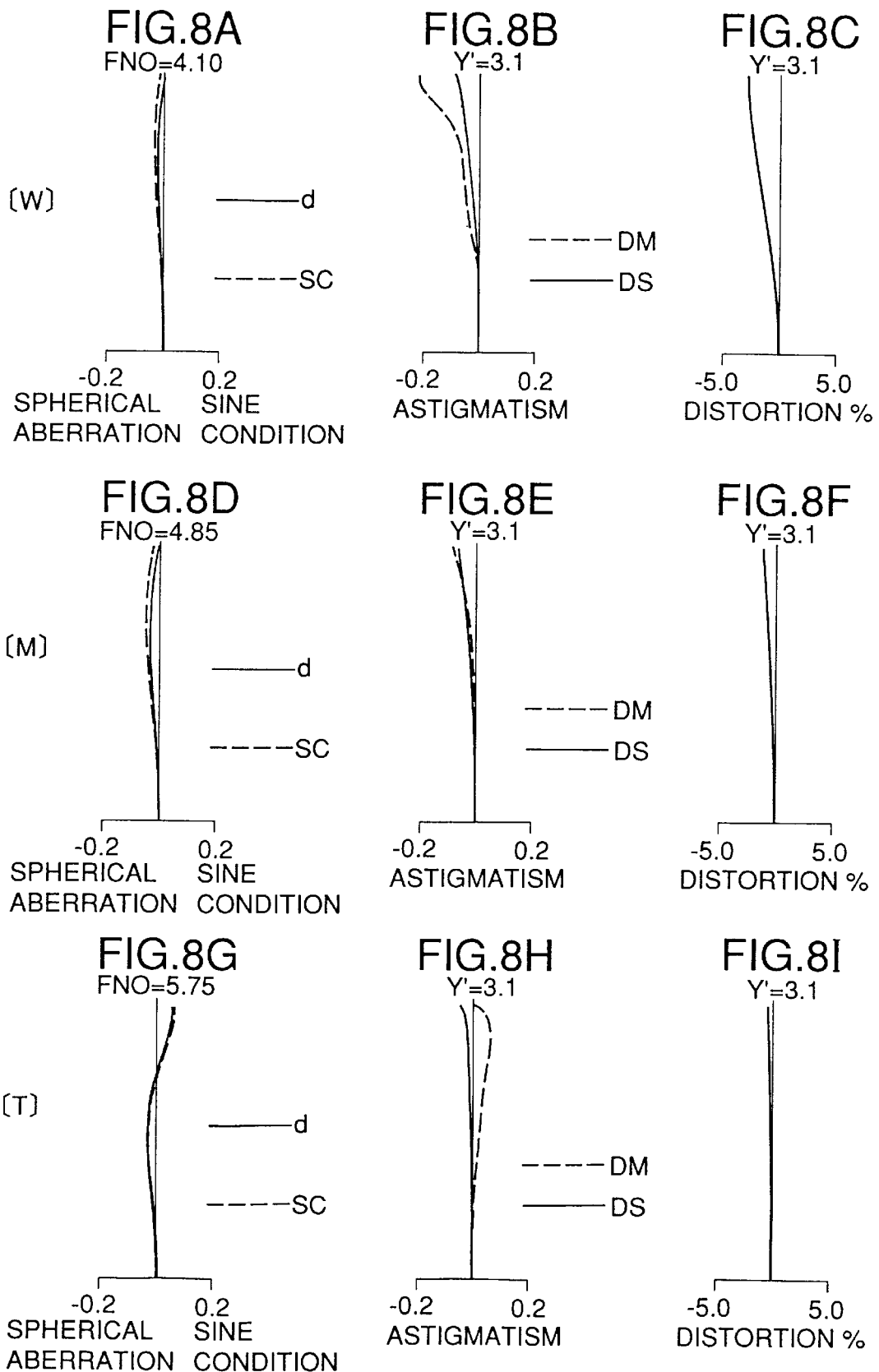
FIGS. 8A to 8I are diagrams showing the aberrations observed in the fourth embodiment.
Figure 9:
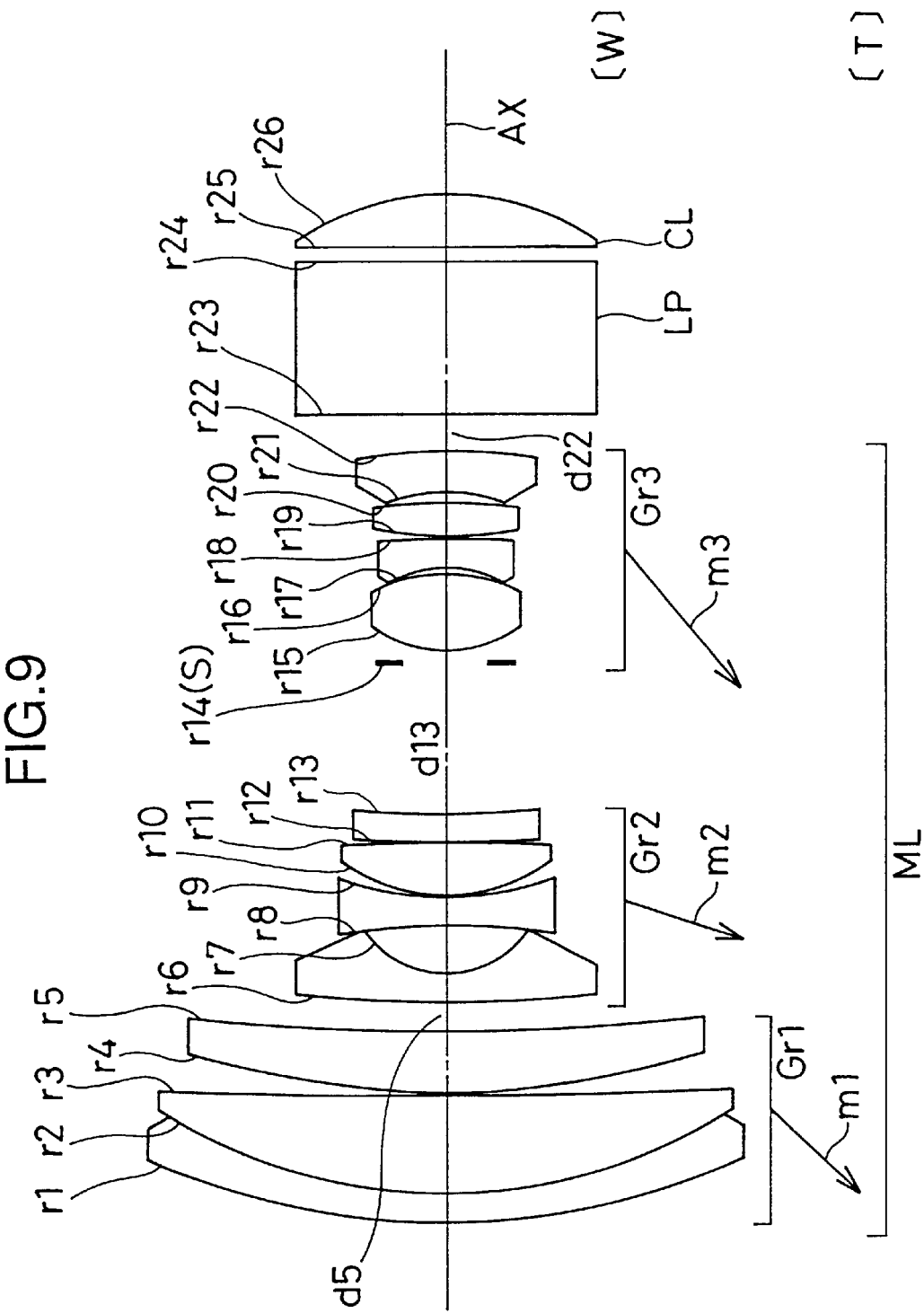
FIG. 9 is a diagram showing the lens construction of the taking optical system of a fifth embodiment of the present invention.
Figure 10:
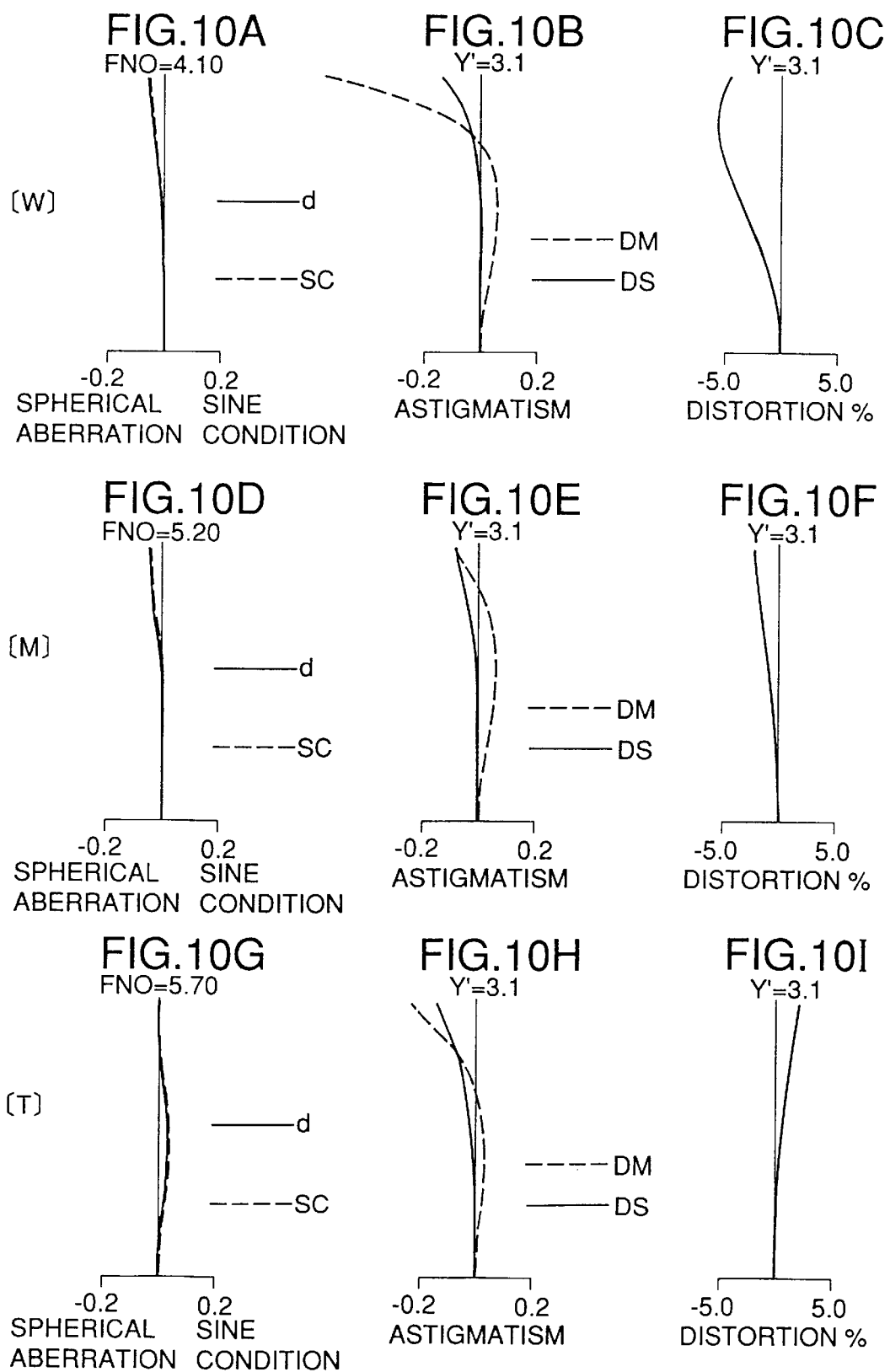
FIGS. 10A to 10I are diagrams showing the aberrations observed in the fifth embodiment.
Figure 11:
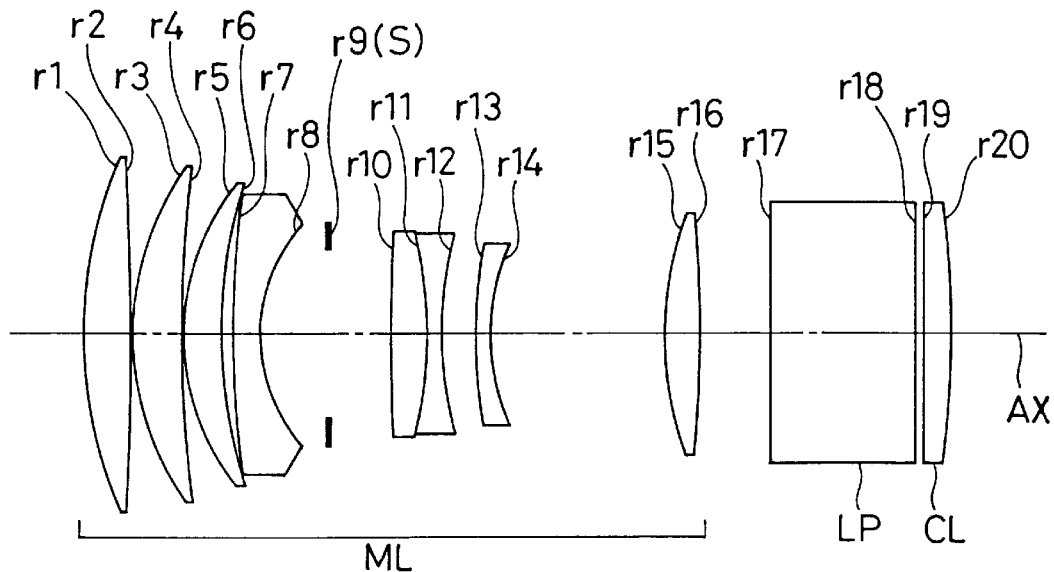
FIG. 11 is a diagram showing the lens construction of the taking optical system of a sixth embodiment of the present invention.
Figure 12A:
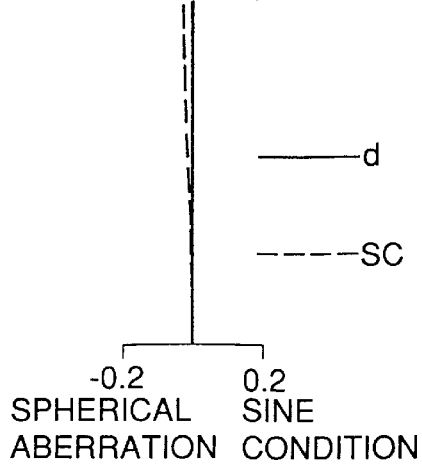
FIGS. 12A to 12C are diagrams showing the aberrations observed in the sixth embodiment.
Figure 12B:
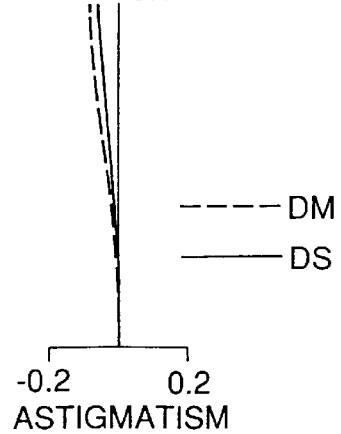
Figure 12C:
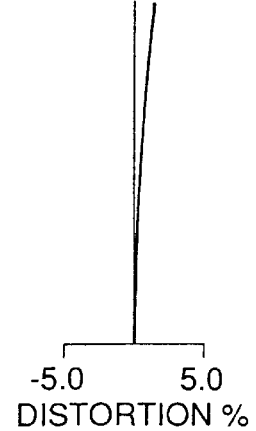
Figure 13:
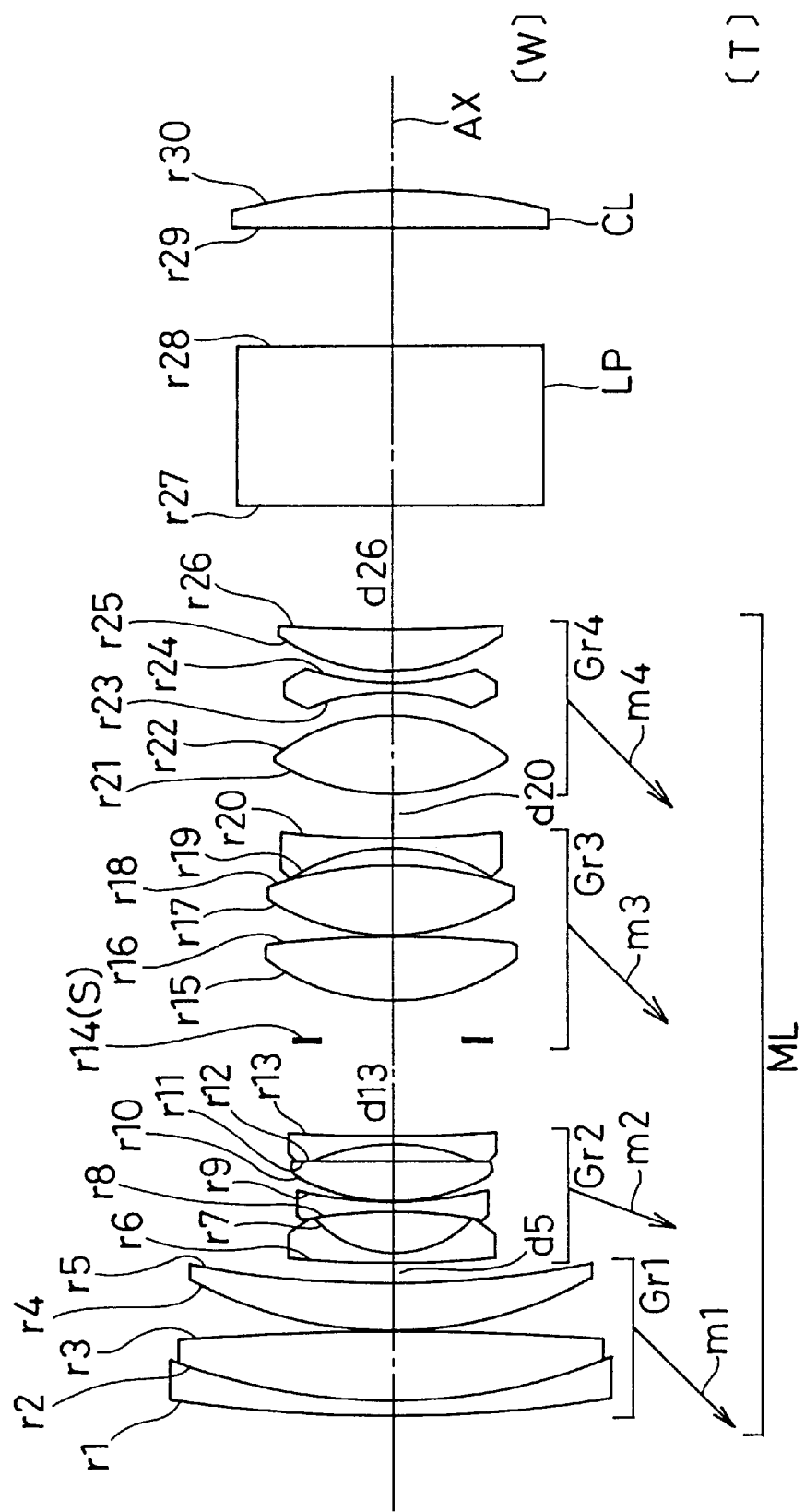
FIG. 13 is a diagram showing the lens construction of the taking optical system of a seventh embodiment of the present invention.
Figure 14:
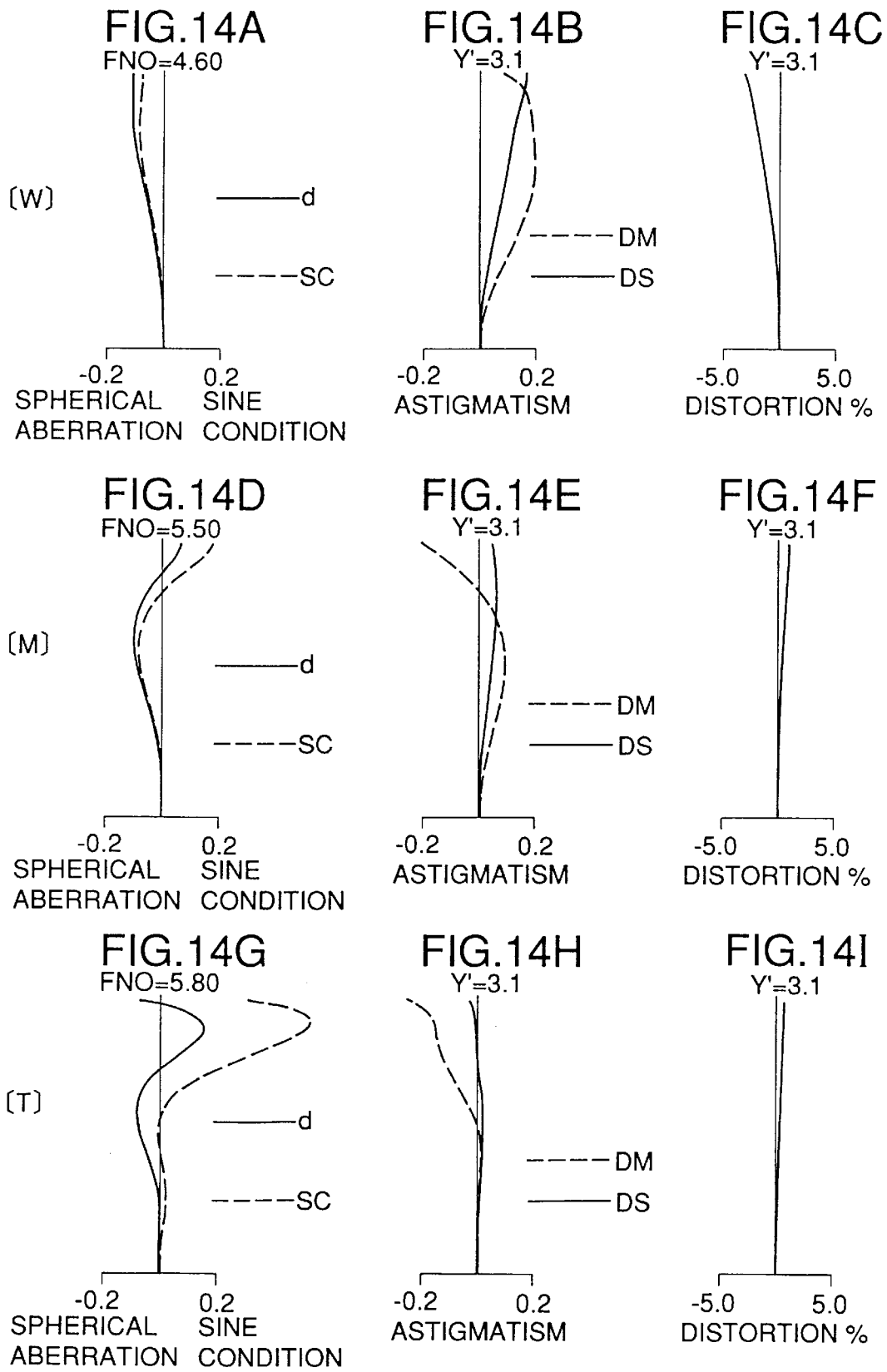
FIGS. 14A to 14I are diagrams showing the aberrations observed in the seventh embodiment.

Hereinafter, taking optical systems embodying the present invention will be described with reference to the drawings.

FIGS. 1, 3, 5, 7, 9, 11, 13 show the lens constructions of the taking optical systems of first to seventh embodiments, respectively. For the second, fourth, fifth, and seventh embodiments, which are each constructed as a zoom lens, the lens construction in their shortest focal length condition [W] is shown in the corresponding figures, and the movement of their constituent lens units Gr1 to Gr3 during zooming from the shortest focal length condition [W] to the longest focal length condition [T] is schematically indicated by arrows m1 to m3. In all of these lens construction diagrams, ri (i=1, 2, 3, . . . ) represents the radius of curvature of the i-th surface from the object side. In lens construction diagrams for the embodiments constructed as zoom lenses, di (i=1, 2, 3, . . . ) represents the i-th axial distance from the object side, though only those which vary with zooming appear in this figure.

The taking optical systems of the first to seventh embodiments are all used to form an object image on a solid-state image device, and are each constituted of, from the object side, a master optical system ML having positive optical power, a low-pass filter LP, and a condenser lens CL having positive optical power. The condenser lens CL is disposed between the master optical system ML and the solid-state image device and in the vicinity of the image surface of the solid-state image device, and its positive optical power acts such that the exit pupil of the taking optical system is placed substantially at infinity. The taking optical systems of the first, third, and sixth embodiments are each constructed as a single-focal-length lens, whereas those of the second, fourth, fifth, and seventh embodiments are each constructed as a zoom lens.

In the first embodiment, the master optical system ML is constituted of, from the object side, two positive meniscus lens elements with their convex surfaces facing toward the object side, a negative meniscus lens element with its concave surface facing toward the image side, an aperture diaphragm S, a negative meniscus lens element with its concave surface facing toward the object side, and a positive biconvex lens element. The condenser lens CL is composed of a plano-convex lens element with its convex surface facing toward the image side.

In the second embodiment, the master optical system ML is constituted of, from the object side, a first lens unit Gr1 composed of a negative biconcave lens element and a positive meniscus lens element with its convex surface facing toward the object side; a second lens unit Gr2 composed of a positive biconvex lens element, a negative meniscus lens element with its concave surface facing toward the image side, a positive biconvex lens element, and an aperture diaphragm S; and a third lens unit Gr3 composed of a positive meniscus lens element with its convex surface facing toward the image side and a negative meniscus lens element with its concave surface facing toward the object side. The condenser lens CL is composed of a plano-convex lens element with its convex surface facing toward the image side. Although the master optical system ML is constructed as an independent three-unit zoom lens having its own optical performance, it serves, during zooming, as the principal portion of a four-unit zoom lens constituted by the entire taking optical system which includes, as its fourth lens unit, the low-pass filter LP and the condenser lens CL that are fixed.

In the third embodiment, the master optical system ML is constituted of, from the object side, a negative meniscus lens element with its convex surface facing toward the object side, a positive biconvex lens element, an aperture diaphragm S, a negative biconcave lens element, a positive meniscus lens element with its convex surface facing toward the image side, and a positive biconvex lens element. The condenser lens CL is composed of a plano-convex lens element with its convex surface facing toward the image side.

In the fourth embodiment, the master optical system ML is constituted of, from the object side, a first lens unit Gr1 composed of a negative meniscus lens element with its concave surface facing toward the image side and a positive meniscus lens element with its convex surface facing toward the object side; and a second lens unit Gr2 composed of an aperture diaphragm S, a positive meniscus lens element with its convex surface facing toward the object side, and a negative meniscus lens element with its concave surface facing toward the object side. The condenser lens CL is composed of a plano-convex lens element with its convex surface facing toward the image side. Although the master optical system ML is constructed as an independent two-unit zoom lens having its own optical performance, it serves, during zooming, as the principal portion of a three-unit zoom lens constituted by the entire taking optical system which includes, as its third lens unit, the low-pass filter LP and the condenser lens CL that are fixed.

In the fifth embodiment, the master optical system ML is constituted of, from the object side, a first lens unit Gr1 composed of a doublet lens element produced by bonding together a negative meniscus lens element with its concave surface facing toward the image side and a positive meniscus lens element with its convex surface facing toward the object side, and a positive meniscus lens element with its convex surface facing toward the object side; a second lens unit Gr2 composed of a negative meniscus lens element with its concave surface facing toward the image side, a negative biconcave lens element, a positive biconvex lens element, and a negative meniscus lens element with its concave surface facing toward the image side; a third lens unit Gr3 composed of an aperture diaphragms S, a positive biconvex lens element, a negative meniscus lens element with its concave surface facing toward the object side, a positive biconvex lens element, and a negative meniscus lens element with its concave surface facing toward the object side. The condenser lens CL is composed of a plano-convex lens element with its convex surface facing toward the image side. Although the master optical system ML is constructed as an independent three-unit zoom lens having its own optical performance, it serves, during zooming, as the principal portion of a four-unit zoom lens constituted by the entire taking optical system which includes, as its fourth lens unit, the low-pass filter LP and the condenser lens CL that are fixed.

In the sixth embodiment, the master optical system ML is constituted of, from the object side, a positive biconvex lens element, two positive meniscus lens elements with their convex surfaces facing toward the object side, a negative meniscus lens element with its concave surface facing toward the image side, an aperture diaphragm, a doublet lens element produced by bonding together a positive biconvex lens element and a negative biconcave lens element, a negative meniscus lens element with its concave surface facing toward the image side, and a positive biconvex lens element. The condenser lens CL is composed of a plano-convex lens element with its convex surface facing toward the image side.

In the seventh embodiment, the master optical system ML is constituted of, from the object side, a first lens unit Gr1 composed of a doublet lens element produced by bonding together a negative meniscus lens element with its concave surface facing toward the image side and a positive biconvex lens element, and a positive meniscus lens element with its convex surface facing toward the object side; a second lens unit Gr2 composed of a negative meniscus lens element with its concave surface facing toward the image side, a negative biconcave lens element, a positive biconvex lens element, and a negative biconcave lens element; a third lens unit Gr3 composed of an aperture diaphragm S, two positive biconvex lens elements, and a negative biconcave lens element; and a fourth lens unit Gr4 composed of a positive biconvex lens element, a negative biconcave lens element, and a positive meniscus lens element with its convex surface facing toward the object side. The condenser lens CL is composed of a plano-convex lens element with its convex surface facing toward the image side. Although the master optical system ML is constructed as an independent four-unit zoom lens having its own optical performance, it serves, during zooming, as the principal portion of a five-unit zoom lens constituted by the entire taking optical system which includes, as its fifth lens unit, the low-pass filter LP and the condenser lens CL that are fixed.

In all of the first to seventh embodiments, the positive optical power of the condenser lens CL, which is disposed between the master optical system ML and the solid-state image device and in the vicinity of the image surface of the solid-state image device, acts such that the exit pupil of the taking optical system is placed substantially at infinity, as described previously. The condenser lens CL thus serves to shift the exit pupil of the taking optical system away from the image surface, and accordingly its use makes it possible to shorten the overall length of the taking optical system. In addition, the exit pupil of the taking optical system can be shifted away from the image surface with far less degradation of the imaging performance of the master optical system ML than in conventional constructions lacking the condenser lens CL.

The optical power of the condenser lens CL is determined in accordance with the position of the exit pupil of the master optical system ML. As the condenser lens CL has stronger optical power, it shifts the exit pupil of the taking optical system farther away. Therefore, as the exit pupil of the master optical system ML is closer to the image surface, the condenser lens CL needs to be given stronger power. In the second, fourth, fifth, and seventh embodiments, where the master optical system ML is a zoom lens, the exit pupil moves along the optical axis AX during zooming. In this case, therefore, it is preferable to additionally balance the exit pupil position in the shortest focal length condition [W] with that in the longest focal length condition [T].

Figure 15:
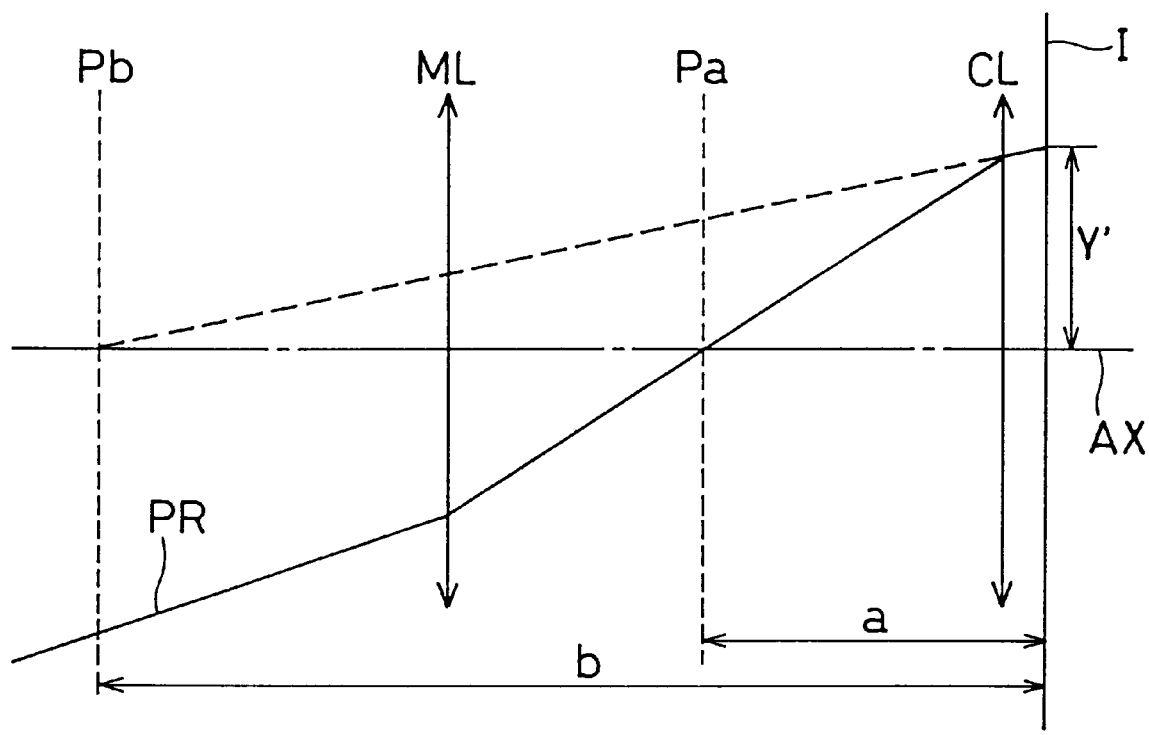
FIG. 15 is a schematic diagram of the taking optical systems according to the present invention, in explanation of the conditions to be satisfied therein.

The conditions that need to be satisfied in the first to seventh embodiments will be described below. The variables and symbols used in these conditions and in their descriptions are illustrated in FIG. 15. In FIG. 15, PR represents the principal ray of the most off-axial light beam.

In the first and second embodiments, conditions (1) and (2) below are satisfied:

$$\frac{a}{Y'} < 5.0 \tag{1}$$

$$\left|\frac{b}{a}\right| < 2.0 \tag{2}$$

where a represents the distance between the exit pupil position Pa of the master optical system ML and the image surface I;

b represents the distance between the exit pupil position Pb of the taking optical system and the image surface I; and Y' represents the maximum image height.

Condition (1) defines the relation between the exit pupil position Pa of the master optical system ML and the maximum image height Y'. By condition (1), the exit pupil position Pa of the master optical system ML is determined in accordance with the image-surface size of the solid-state image device. The exit pupil position Pa of the master optical system ML depends on the size of the master optical system ML. Specifically, as the exit pupil position Pa is placed farther from the image surface I, the overall length of the taking optical system becomes longer. If the exit pupil position Pa of the master optical system ML is so far from the image surface I that condition (1) is no more satisfied, the overall length of the master optical system ML is too long to be reduced even by providing the condenser lens CL. As a result, it is not possible to make the taking optical system compact enough.

Condition (2) defines the relation between the exit pupil position Pa of the master optical system ML and the exit pupil position Pb of the taking optical system, and represents how far the action of the condenser lens CL shifts the exit pupil away from the image surface I. If condition (2) is not satisfied, the exit pupil is shifted too far. This means that the optical power of the condenser lens CL is too strong, and, as a result, it is difficult to correct properly the curvature of field and distortion caused by the condenser lens CL itself.

In the first and second embodiments, it is preferable that condition (3) below be satisfied additionally:

$$0.15 < \frac{\phi C}{\phi M} < 1.00 \quad (3)$$

where

φC represents the optical power of the condenser lens CL; and

φM represents the optical power of the master optical system ML.

Condition (3) defines the ratio of the optical power of the condenser lens CL to that of the master optical system ML. When condition (3) is satisfied, it is possible to shift the exit pupil position Pb of the taking optical system far enough without unduly sacrificing proper correction of aberrations. If the lower limit of condition (3) is exceeded, the relative optical power of the condenser lens CL is too weak, and thus the exit pupil cannot be shifted far enough. As a result, it is difficult to place the exit pupil position Pb of the taking optical system substantially at infinity. If the upper limit of condition (3) is exceeded, the optical power of the condenser lens CL is too strong. As a result, it is difficult to correct properly the curvature of field caused by the condenser lens CL itself.

In the third to fifth embodiments, condition (4) below is satisfied:

$$1.8 < \left|\frac{b}{a}\right| \quad (4)$$

where a represents the distance between the exit pupil position Pa of the master optical system ML and the image surface I; and b represents the distance between the exit pupil position Pb of the taking optical system and the image surface I.

Condition (4) defines the relation between the exit pupil position Pa of the master optical system ML and the exit pupil position Pb of the taking optical system, and represents how far the action of the condenser lens CL shifts the exit pupil away from the image surface I. If condition (4) is not satisfied, the action of the condenser lens CL is too weak to shift the exit pupil far enough, and thus the use of the condenser lens CL does not lead to any improvement. In addition, since the taking optical system as a whole needs to be made larger, it is not possible to shorten its overall length.

In the third to fifth embodiments, it is preferable that conditions (5) and (6) below be satisfied additionally:

$$\frac{Y'}{LB} < 1 \quad (5)$$

$$0.2 < \phi C \cdot a_{min} < 1.0 \quad (6)$$

where

Y' represents the maximum image height;

LB represents the distance between the image-side end surface of the master optical system ML and the image surface I (for the embodiments in which the master optical system ML is a zoom lens, the minimum value throughout the entire zoom range is taken);

$a_{min}$ represents the distance between the exit pupil position Pa of the master optical system ML and the image surface I (for the embodiments in which the master optical system ML is a zoom lens, the minimum value throughout the entire zoom range is taken); and φC represents the optical power of the condenser lens CL.

Condition (5) defines the ratio of the distance LB between the image-side end surface of the master optical system ML and the image surface I to the maximum image height Y'. By condition (5), the distance LB between the image-side end surface of the master optical system ML and the image surface I is determined in accordance with the image-surface size of the solid-state image device. If the distance LB between the image-side end surface of the master optical system ML and the image surface I is so short that condition (5) is no more satisfied, it is difficult to arrange the low-pass filter LP and the condenser lens CL between the image-side end surface of the master optical system ML and the image surface I.

Condition (6) defines the relation between the optical power of the condenser lens CL and the exit pupil position Pa of the master optical system ML. From condition (6), it is known that, as the exit pupil position Pa of the master optical system ML is farther from the image surface I, the optical power φC of the condenser lens CL needs to be weaker, and that, as the exit pupil position Pa of the master optical system ML is closer to the image surface I, the optical power qC of the condenser lens CL needs to be stronger. When condition (6) is satisfied, the exit pupil position Pb of the taking optical system is placed within an appropriate range.

If the optical power of the condenser lens CL is so weak that the lower limit of condition (6) is exceeded, the action of the condenser lens CL is too weak, and thus the exit pupil cannot be shifted far enough. In this case, in order to place the exit pupil position Pb of the taking optical system within an appropriate range, the exit pupil position Pa of the master optical system ML needs to be shifted farther away from the image surface I. As a result, the taking optical system needs to be made larger. If the optical power of the condenser lens CL is so strong that the upper limit of condition (6) is exceeded, the action of the condenser lens CL is too strong, and thus the exit pupil is shifted too far. As a result, not only the exit pupil position Pb of the taking optical system is placed too far away from the image surface I, but also it is difficult to correct aberrations (in particular, curvature of field and distortion).

In the sixth and seventh embodiments, conditions (7) and (8) below are satisfied:

$$6.7 < \frac{a}{Y'} \quad (7)$$

$$\left|\frac{b}{a}\right| < 2.0 \quad (8)$$

where a represents the distance between the exit pupil position Pa of the master optical system ML and the image surface I;

b represents the distance between the exit pupil position Pb of the entire optical system and the image surface I; and Y' represents the maximum image height.

Condition (7) defines the relation between the exit pupil position Pa of the master optical system ML and the maximum image height Y'. By condition (7), the exit pupil position Pa of the master optical system ML is determined in accordance with the image-surface size of the solid-state image device. If the exit pupil position Pa of the master optical system ML is so close to the image surface I that condition (7) is no more satisfied, the condenser lens CL needs to be given stronger optical power so that the exit pupil position is shifted farther away. As a result, aberrations (in particular, curvature of field and distortion) become too great to be corrected properly.

Condition (8) defines the relation between the exit pupil position Pa of the master optical system ML and the exit pupil position Pb of the taking optical system, and represents how far the action of the condenser lens CL shifts the exit pupil away from the image surface I. If condition (8) is not satisfied, the exit pupil position is shifted too far. This means that the optical power of the condenser lens CL is too strong, and, as a result, it is difficult to correct the curvature of field and distortion caused by the condenser lens CL itself.

As described earlier, in a taking optical system in which the master optical system ML is a zoom lens, and in which the exit pupil therefore moves along the optical axis AX during zooming, it is preferable to balance the exit pupil position in the shortest focal length condition [W] with that in the longest focal length condition [T]. Accordingly, in the ninth embodiment, it is preferable that condition (9) below be satisfied additionally:

$$0.01 < \phi C \cdot \frac{\phi W}{\phi T} < 1.00 \tag{9}$$

where $\phi C$ represents the optical power of the condenser lens CL;

$\phi W$ represents the optical power of the taking optical system when it is in the shortest focal length condition [W]; and $\phi T$ represents the optical power of the taking optical system when it is in the longest focal length condition [T].

Condition (9) defines the relation between the optical power of the condenser lens CL and the zoom ratio ($\phi W/\phi T$) of the taking optical system. When condition (9) is satisfied, it is possible to balance the exit pupil position Pb in the shortest focal length condition [W] with that in the longest focal length condition [T]. If the lower limit of condition (9) is exceeded, the refractive power of the condenser lens CL is too weak relative to the zoom ratio, with the result that the exit pupil cannot be shifted far enough in the longest focal length condition [T] or in the shortest focal length condition [W]. If the upper limit of condition (9) is exceeded, the refractive power of the condenser lens CL is too strong relative to the zoom ratio, with the result that the exit pupil is shifted too far, i.e. past infinity, causing an off-axial light beam 3 to enter the microlenses 2 in a way as illustrated in FIG. 16C. In this case, since the off-axial light beam 3 enters the microlenses from a direction that is not perpendicular to the light-receiving surfaces of the light-sensing devices, the light-condensing ability of the microlenses is impaired.

Figure 16A:
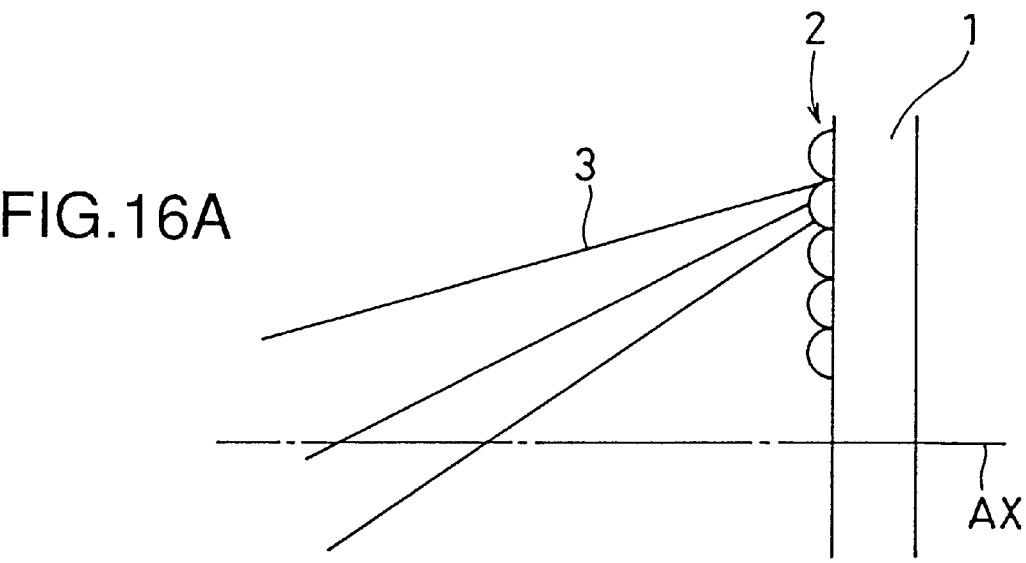
FIGS. 16A to 16C are diagrams schematically showing an off-axial light beam striking the solid-state image device, in explanation of the action of the condenser lenses.
Figure 16B:
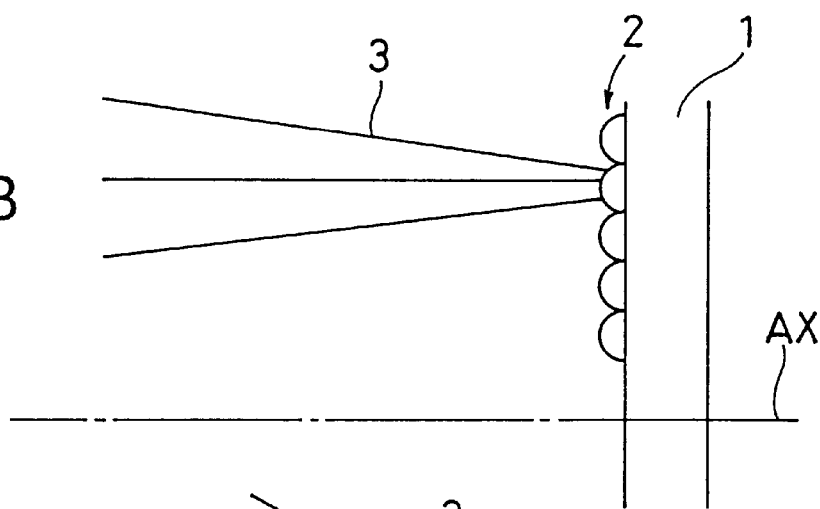
Figure 16C:
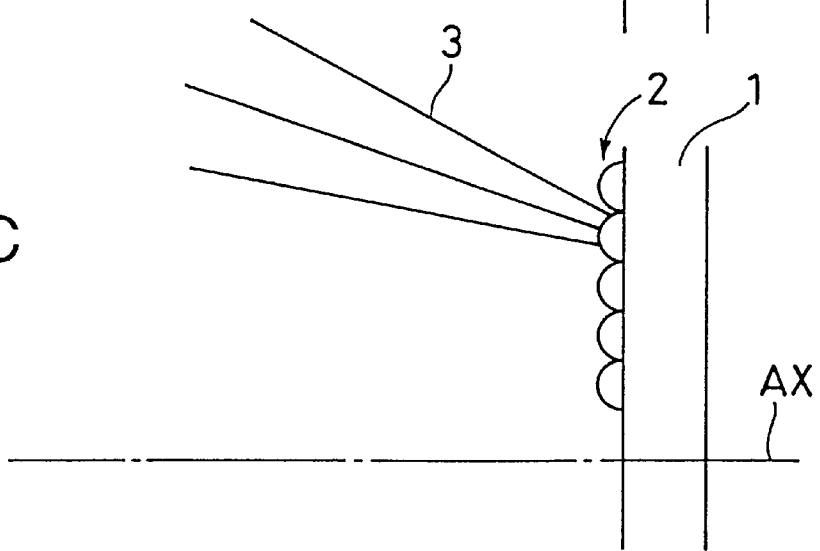

FIGS. 16A to 16C show how an off-axial light beam 3 that has exited from the taking optical system strikes a solid-state image device (such as a CCD) 1 having microlenses 2 disposed on its light-receiving surface. FIG. 16A illustrates the path the off-axial light beam 3 takes when the condenser lens CL is not provided; FIG. 16B illustrates the ideal path the off-axial light beam 3 takes when the condenser lens CL is provided; FIG. 16C illustrates the path the off-axial light beam 3 takes when the condenser lens CL has excessively strong optical power $\phi C$.

Tables 1 to 7 list the construction data of the taking optical systems of the first to seventh embodiments (FIGS. 1, 3, 5, 7, 9, 11 and 13), respectively.

In the construction data of all of the embodiments, the following symbols are used: ri (i=1, 2, 3, . . . ) represents the radius of curvature of the i-th surface from the object side; di (i=1, 2, 3, . . . ) represents the i-th axial distance from the object side; Ni (i=1, 2, 3, . . . ) and vi (i=1, 2, 3, . . . ) respectively represent the refractive index (Nd) and Abbe number (vd) for d-lines of the i-th lens element from the object side; f and FNO respectively represent the focal length and f-number of the entire optical system. Note that, for those axial distances which vary with zooming (variable distances), and for the focal length f and f-number FNO of the entire optical system, three values are listed together which are, from the left, the value in the shortest focal length condition [W], the value in the middle focal length condition [M], and the value in the longest focal length condition [T].

Moreover, in the construction data of all of the embodiments, a surface marked with an asterisk (*) in its radius-of-curvature column is an a spherical surface, whose surface curve is defined by formula (AS) below:

$$X = \frac{C \cdot Y^2}{1 + (1 - \varepsilon \cdot C^2 \cdot Y^2)^{1/2}} + \sum_i Ai \cdot y^i \tag{AS}$$

where

X represents the displacement from the reference surface of the X-axis direction;

Y represents the height in a direction perpendicular to the optical axis;

C represents the paraxial curvature;

$\varepsilon$ represents the quadric surface parameter; and

Ai represents the aspherical coefficient of the i-th order.

Table 8 lists the values corresponding to conditions (1) to (3) in the first and second embodiments. Note that, for the second embodiment, in which the master optical system ML is a zoom lens, the values as observed in the shortest focal length condition [W] are listed. In practice, the distances a and b and the optical power $\phi M$ vary with zooming. However, since the zoom lens of the second embodiment is of the type in which the aperture diaphragm S moves monotonically toward the object side during zooming from the shortest focal length condition [W] to the longest focal length condition [T], conditions (1) to (3) are most difficult to comply with in the shortest focal length condition [W]. In other words, in the second embodiment, if conditions (1) to (3) are satisfied in the shortest focal length condition [W], they are satisfied over the entire zoom range.

Table 9 lists the values corresponding to conditions (4) to (6) in the third to fifth embodiments. Note that, for the fourth and fifth embodiments, in which the master optical system ML is a zoom lens, the values as observed in the shortest focal length condition [W] are listed. In practice, the distances a, b, and LB vary with zooming. However, since the zoom lenses of the fourth and fifth embodiments are of the type in which the aperture diaphragm S moves monotonically toward the object side during zooming from the shortest focal length condition [W] to the longest focal length condition [T], conditions (4) to (6) are most difficult to comply with in the shortest focal length condition [W]. In other words, in the fourth and fifth embodiments, if conditions (4) to (6) are satisfied in the shortest focal length condition [W], they are satisfied over the entire zoom range.

Note that the distance a is shortest in the shortest focal length condition [W] throughout the entire zoom range, and the distance a in that condition is represented as $a_{min}$.

Table 10 lists the values corresponding to conditions (7) to (9) in the sixth and seventh embodiments. Note that, for the seventh embodiment, in which the master optical system ML is a zoom lens, the values as observed in the shortest focal length condition [W] are listed. In practice, the distances a and b vary with zooming. However, since the zoom lens of the seventh embodiment is of the type in which the aperture diaphragm S moves monotonically toward the object side during zooming from the shortest focal length condition [W] to the longest focal length condition [T], conditions (7) to (9) are most difficult to comply with in the shortest focal length condition [W]. In other words, in the seventh embodiment, if conditions (7) to (9) are satisfied in the shortest focal length condition [W], they are satisfied over the entire zoom range.

FIGS. 2A to 2C, 4A to 4I, 6A to 6C, 8A to 8I, 10A to 10I, 12A to 12C, and 14A to 14I show the aberrations observed in the first to seventh embodiments, respectively. For the embodiments which are constructed as a zoom lens, the aberrations as observed in three different focal length conditions are separately shown. Specifically, for the second, fourth, fifth, and seventh embodiments, FIGS. 4A to 4C, 8A to 8C, 10A to 10C, and 14A to 14C illustrate the aberrations appearing in the shortest focal length condition [W], FIGS. 4D to 4F, 8D to 8F, 10D to 10F, and 14D to 14F illustrate the aberrations appearing in the middle focal length condition [M], and FIGS. 4G to 4I, 8G to 8I, 10G to 10I, and 14G to 14I illustrate the aberrations appearing in the longest focal length condition [T]. In all of these aberration diagrams, a solid line (d) represents the aberration for d-lines, a broken line (SC) represents the sine condition, and a broken line (DM) and a solid line (DS) represent the astigmatism on the meridional and sagittal planes, respectively.

As described above, according to the present invention, it is possible to place the exit pupil of a taking optical system far away from the image surface even when the taking optical system is made more compact. Accordingly, it is possible to realize a taking optical system that has a relatively short overall length despite having its exit pupil substantially at infinity. By use of such a taking optical system, it is possible to prevent images shot by a solid-state image device from becoming dimmer at their peripheral portion than at their central portion, that is, it is possible to obtain uniform brightness in such images.

TABLE 1

<< Embodiment 1 >>
f = 6.2
FNO = 4.5

| Radius of Curvature | Axial Distance | Refractive Index | Abbe Number |
|---|---|---|---|
| r1 = 3.220 | | | |
| | d1 = 0.800 | N1 = 1.79952 | v1 = 42.24 |
| r2 = 23.087 | | | |
| | d2 = 0.100 | | |
| r3 = 2.476 | | | |
| | d3 = 0.400 | N2 = 1.77250 | v2 = 49.62 |
| r4 = 2.961 | | | |
| | d4 = 0.250 | | |
| r5 = 15.216 | | | |
| | d5 = 0.150 | N3 = 1.80518 | v3 = 25.43 |
| r6 = 1.868 | | | |
| | d6 = 0.500 | | |

TABLE 1-continued

<< Embodiment 1 >>
f = 6.2
FNO = 4.5

| Radius of Curvature | Axial Distance | Refractive Index | Abbe Number |
|---|---|---|---|
| r7 = ∞ (Aperture Diaphragm S) | | | |
| | d7 = 0.700 | | |
| r8 = −1.515 | | | |
| | d8 = 0.250 | N4 = 1.58340 | v4 = 30.23 |
| r9 = −1.665 | | | |
| | d9 = 0.100 | | |
| r10 = 13.547 | | | |
| | d10 = 0.650 | N5 = 1.69680 | v5 = 55.53 |
| r11 = −4.548 | | | |
| | d11 = 0.500 | | |
| r12 = ∞ | | | |
| | d12 = 3.600 | N6 = 1.51680 | v6 = 64.20 . . . LP |
| r13 = ∞ | | | |
| | d13 = 0.200 | | |
| r14 = ∞ | | | |
| | d14 = 0.800 | N7 = 1.75450 | v7 = 51.57 . . . CL |
| r15 = −10.870 | | | |

TABLE 2

<< Embodiment 2 >>
f = 8.2 ~ 15.0 ~ 27.0
FNO = 4.1 ~ 6.1 ~ 8.24

| Radius of Curvature | Axial Distance | Refractive Index | Abbe Number |
|---|---|---|---|
| r1 = −47.224 | | | |
| | d1 = 0.500 | N1 = 1.80100 | v1 = 46.54 |
| r2 = 5.757 | | | |
| | d2 = 0.700 | | |
| r3 = 6.528 | | | |
| | d3 = 1.450 | N2 = 1.83350 | v2 = 21.00 |
| r4 = 14.092 | | | |
| | d4 = 7.139 ~ 4.470 ~ 1.735 | | |
| r5* = 3.715 | | | |
| | d5 = 1.250 | N3 = 1.57885 | v3 = 69.57 |
| r6* = −63.854 | | | |
| | d6 = 0.100 | | |
| r7 = 308.501 | | | |
| | d7 = 0.981 | N4 = 1.84666 | v4 = 23.82 |
| r8 = 4.385 | | | |
| | d8 = 0.435 | | |
| r9 = 8.637 | | | |
| | d9 = 1.095 | N5 = 1.65446 | v5 = 33.86 |
| r10 = −7.370 | | | |
| | d10 = 0.569 | | |
| r11 = ∞ (Aperture Diaphragm S) | | | |
| | d11 = 3.351 ~ 1.809 ~ 1.784 | | |
| r12* = −18.214 | | | |
| | d12 = 1.000 | N6 = 1.58340 | v6 = 30.23 |
| r13 = −6.471 | | | |
| | d13 = 1.000 | | |
| r14 = −3.812 | | | |
| | d14 = 0.310 | N7 = 1.78831 | v7 = 47.32 |
| r15 = −21.539 | | | |
| | d15 = 0.200 ~ 7.111 ~ 15.172 | | |

TABLE 2-continued

<< Embodiment 2 >>
f = 8.2 ~ 15.0 ~ 27.0
FNO = 4.1 ~ 6.1 ~ 8.24

| Radius of Curvature | Axial Distance | Refractive Index | Abbe Number |
|---|---|---|---|
| r16 = ∞ | | | |
| | d16 = 4.000 | N8 = 1.51680 | ν8 = 64.20 . . . LP |
| r17 = ∞ | | | |
| | d17 = 0.200 | | |
| r18 = ∞ | | | |
| | d18 = 0.800 | N9 = 1.77250 | ν9 = 49.77 . . . CL |
| r19 = −11.111 | | | |

[Aspherical Coefficients]

r5: ε = 1.0000
A4 = −0.81615 × $10^{-3}$
A6 = 0.84500 × $10^{-4}$
A8 = −0.77756 × $10^{-4}$
A10 = 0.13292 × $10^{-4}$
A12 = −0.12185 × $10^{-5}$
r6: ε = 1.0000
A4 = 0.18470 × $10^{-2}$
A6 = −0.10277 × $10^{-4}$
A8 = −0.47766 × $10^{-4}$
A10 = 0.82440 × $10^{-5}$
A12 = −0.84956 × $10^{-6}$
r12: ε = 1.0000
A4 = 0.12450 × $10^{-2}$
A6 = −0.17142 × $10^{-3}$
A8 = 0.58540 × $10^{-4}$
A10 = −0.64512 × $10^{-5}$
A12 = 0.35323 × $10^{-6}$

TABLE 3

<< Embodiment 3 >>
f = 6.2
FNO = 3.5

| Radius of Curvature | Axial Distance | Refractive Index | Abbe Number |
|---|---|---|---|
| r1 = 9.168 | | | |
| | d1 = 0.434 | N1 = 1.58313 | ν1 = 59.38 |
| r2* = 221.093 | | | |
| | d2 = 4.156 | | |
| r3 = 6.633 | | | |
| | d3 = 1.427 | N2 = 1.78590 | ν2 = 44.19 |
| r4 = −28.421 | | | |
| | d4 = 1.613 | | |
| r5 = ∞ (Aperture Diaphragm S) | | | |
| | d5 = 1.117 | | |
| r6 = −4.272 | | | |
| | d6 = 0.434 | N3 = 1.84666 | ν3 = 23.89 |
| r7 = 12.396 | | | |
| | d7 = 0.124 | | |
| r8 = −81.560 | | | |
| | d8 = 1.000 | N4 = 1.79952 | ν4 = 42.24 |
| r9 = −4.425 | | | |
| | d9 = 0.0 | | |
| r10 = 121.374 | | | |
| | d10 = 1.000 | N5 = 1.78590 | ν5 = 44.19 |
| r11 = −8.077 | | | |
| | d11 = 2.000 | | |
| r12 = ∞ | | | |
| | d12 = 4.300 | N6 = 1.51680 | ν6 = 64.20 . . . LP |
| r13 = ∞ | | | |
| | d13 = 2.000 | | |

TABLE 3-continued

<< Embodiment 3 >>
f = 6.2
FNO = 3.5

| Radius of Curvature | Axial Distance | Refractive Index | Abbe Number |
|---|---|---|---|
| r14 = ∞ | | | |
| | d14 = 1.100 | N7 = 1.51680 | ν7 = 64.20 . . . CL |
| r15 = −10.767 | | | |

[Aspherical Coefficients]
r2: ε = 1.0000
A2 = 0.15479
A4 = 0.25578 × $10^{-2}$
A6 = 0.65957 × $10^{-4}$
A8 = 0.30586 × $10^{-5}$
A10 = 0.15978 × $10^{-6}$

TABLE 4

<< Embodiment 4 >>
f = 6.2 ~ 9.7 ~ 17.5
FNO = 4.1 ~ 4.9 ~ 5.8

| Radius of Curvature | Axial Distance | Refractive Index | Abbe Number |
|---|---|---|---|
| r1 = 65.392 | | | |
| | d1 = 1.000 | N1 = 1.61293 | ν1 = 36.96 |
| r2 = 6.877 | | | |
| | d2 = 3.000 | | |
| r3* = 29.403 | | | |
| | d3 = 2.400 | N2 = 1.84666 | ν2 = 23.82 |
| r4* = 208.263 | | | |
| | d4 = 27.096 ~ 12.747 ~ 1.667 | | |
| r5 = ∞ (Aperture Diaphragm S) | | | |
| | d5 = 1.800 | | |
| r6 = 4.249 | | | |
| | d6 = 2.900 | N3 = 1.61800 | ν3 = 63.39 |
| r7 = 50.171 | | | |
| | d7 = 1.500 | | |
| r8* = −4.854 | | | |
| | d8 = 1.000 | N4 = 1.84666 | ν4 = 23.82 |
| r9* = −11.465 | | | |
| | d9 = 3.000 ~ 5.253 ~ 10.203 | | |
| r10 = ∞ | | | |
| | d10 = 4.300 | N5 = 1.51680 | ν5 = 64.20 . . . LP |
| r11 = ∞ | | | |
| | d11 = 2.500 | | |
| r12 = ∞ | | | |
| | d12 = 1.200 | N6 = 1.58913 | ν6 = 61.11 . . . CL |
| r13 = −14.286 | | | |

[Aspherical Coefficients]

r3: ε = 1.0000
A4 = −0.19608 × $10^{-4}$
A6 = 0.21880 × $10^{-5}$
A8 = −0.80228 × $10^{-8}$
A10 = −0.76205 × $10^{-9}$
A12 = 0.43686 × $10^{-11}$
r4: ε = 1.0000
A4 = −0.15833 × $10^{-3}$
A6 = −0.65843 × $10^{-6}$
A8 = 0.19636 × $10^{-7}$
A10 = −0.17223 × $10^{-8}$
A12 = −0.90220 × $10^{-11}$

TABLE 4-continued

<< Embodiment 4 >>
f = 6.2 ~ 9.7 ~ 17.5
FNO = 4.1 ~ 4.9 ~ 5.8

| Radius of Curvature | Axial Distance | Refractive Index | Abbe Number |
|---|---|---|---|
| r8: $\epsilon =$ | 1.0000 | | |
| A4 = | $0.40439 \times 10^{-2}$ | | |
| A6 = | $0.47048 \times 10^{-4}$ | | |
| A8 = | $0.13896 \times 10^{-5}$ | | |
| A10 = | $0.85541 \times 10^{-9}$ | | |
| A12 = | $0.65927 \times 10^{-11}$ | | |
| r9: $\epsilon =$ | 1.0000 | | |
| A4 = | $0.56004 \times 10^{-2}$ | | |
| A6 = | $0.27703 \times 10^{-3}$ | | |
| A8 = | $0.38550 \times 10^{-5}$ | | |
| A10 = | $0.15857 \times 10^{-8}$ | | |
| A12 = | $0.67739 \times 10^{-11}$ | | |

TABLE 5

<< Embodiment 5 >>
f = 4.1 ~ 7.3 ~ 14.1
FNO = 4.1 ~ 5.2 ~ 5.7

| Radius of Curvature | Axial Distance | Refractive Index | Abbe Number |
|---|---|---|---|
| r1 = 20.833 | | | |
| | d1 = 0.800 | N1 = 1.84666 | ν1 = 23.82 |
| r2 = 14.925 | | | |
| | d2 = 2.700 | N2 = 1.58913 | ν2 = 61.11 |
| r3 = 186.013 | | | |
| | d3 = 0.100 | | |
| r4 = 23.993 | | | |
| | d4 = 1.700 | N3 = 1.62280 | ν3 = 56.88 |
| r5 = 68.710 | | | |
| | d5 = 0.800 ~ 2.143 ~ 8.690 | | |
| r6* = 41.212 | | | |
| | d6 = 0.800 | N4 = 1.78831 | ν4 = 47.32 |
| r7 = 2.719 | | | |
| | d7 = 1.350 | | |
| r8 = −20.759 | | | |
| | d8 = 0.800 | N5 = 1.78831 | ν5 = 47.32 |
| r9 = 8.362 | | | |
| | d9 = 0.050 | | |
| r10 = 5.009 | | | |
| | d10 = 1.500 | N6 = 1.75000 | ν6 = 25.14 |
| r11 = −128.660 | | | |
| | d11 = 0.050 | | |
| r12 = 82.283 | | | |
| | d12 = 0.800 | N7 = 1.80741 | ν7 = 31.59 |
| r13 = 26.630 | | | |
| | d13 = 4.358 ~ 1.606 ~ 0.350 | | |
| r14 = ∞ (Aperture Diaphragm S) | | | |
| | d14 = 0.350 | | |
| r15 = 3.483 | | | |
| | d15 = 2.200 | N8 = 1.67790 | ν8 = 55.38 |
| r16 = −4.170 | | | |
| | d16 = 0.150 | | |
| r17 = −3.558 | | | |
| | d17 = 0.800 | N9 = 1.80518 | ν9 = 25.43 |
| r18 = −63.536 | | | |
| | d18 = 0.100 | | |
| r19 = 13.447 | | | |
| | d19 = 1.000 | N10 = 1.58144 | ν10 = 40.89 |
| r20 = −11.678 | | | |
| | d20 = 0.250 | | |

TABLE 5-continued

<< Embodiment 5 >>
f = 4.1 ~ 7.3 ~ 14.1
FNO = 4.1 ~ 5.2 ~ 5.7

| Radius of Curvature | Axial Distance | Refractive Index | Abbe Number |
|---|---|---|---|
| r21* = −7.226 | | | |
| | d21 = 1.150 | N11 = 1.78831 | ν11 = 47.32 |
| r22 = −18.720 | | | |
| | d22 = 1.000 ~ 3.852 ~ 5.508 | | |
| r23 = ∞ | | | |
| | d23 = 4.300 | N12 = 1.51680 | ν12 = 64.20 . . . LP |
| r24 = ∞ | | | |
| | d24 = 0.400 | | |
| r25 = ∞ | | | |
| | d25 = 1.500 | N13 = 1.51680 | ν13 = 64.20 . . . CL |
| r26 = −7.521 | | | |

[Aspherical Coefficients]

r6: $\epsilon =$ 1.0000
A4 = $-0.14369 \times 10^{-3}$
A6 = $0.19790 \times 10^{-4}$
A8 = $-0.15019 \times 10^{-6}$
A10 = $0.40488 \times 10^{-8}$
A12 = $-0.16614 \times 10^{-8}$
r21: $\epsilon =$ 1.0000
A4 = $-0.74934 \times 10^{-2}$
A6 = $0.18143 \times 10^{-2}$
A8 = $-0.23089 \times 10^{-2}$
A10 = $0.92684 \times 10^{-3}$
A12 = $-0.14570 \times 10^{-3}$

TABLE 6

<< Embodiment 6 >>
f = 27.8
FNO = 3.1

| Radius of Curvature | Axial Distance | Refractive Index | Abbe Number |
|---|---|---|---|
| r1 = 13.591 | | | |
| | d1 = 1.300 | N1 = 1.49310 | ν1 = 83.58 |
| r2 = −207.339 | | | |
| | d2 = 0.100 | | |
| r3 = 8.737 | | | |
| | d3 = 1.400 | N2 = 1.49310 | ν2 = 83.58 |
| r4 = 34.207 | | | |
| | d4 = 0.100 | | |
| r5 = 7.341 | | | |
| | d5 = 1.100 | N3 = 1.72000 | ν3 = 52.14 |
| r6 = 15.351 | | | |
| | d6 = 0.300 | | |
| r7 = 23.959 | | | |
| | d7 = 0.800 | N4 = 1.72100 | ν4 = 33.40 |
| r8 = 4.826 | | | |
| | d8 = 2.000 | | |
| r9 = ∞ (Aperture Diaphragm S) | | | |
| | d9 = 1.900 | | |
| r10 = 59.048 | | | |
| | d10 = 1.100 | N5 = 1.75520 | ν5 = 27.51 |
| r11 = −12.134 | | | |
| | d11 = 0.450 | N6 = 1.72000 | ν6 = 50.31 |
| r12 = 11.119 | | | |
| | d12 = 1.000 | | |
| r13 = 16.168 | | | |
| | d13 = 0.450 | N7 = 1.58144 | ν7 = 40.89 |

TABLE 6-continued

<< Embodiment 6 >>
f = 27.8
FNO = 3.1

| Radius of Curvature | Axial Distance | Refractive Index | Abbe Number |
|---|---|---|---|
| r14 = 7.363 | | | |
| | d14 = 5.000 | | |
| r15 = 9.974 | | | |
| | d15 = 1.100 | N8 = 1.48749 | ν8 = 70.44 |
| r16 = −35.920 | | | |
| | d16 = 2.000 | | |
| r17 = ∞ | | | |
| | d17 = 4.300 | N9 = 1.51680 | ν9 = 64.20 . . . LP |
| r18 = ∞ | | | |
| | d18 = 0.200 | | |
| r19 = ∞ | | | |
| | d19 = 0.800 | N10 = 1.75450 | ν10 = 51.57 . . . CL |
| r20 = −33.333 | | | |

TABLE 7

<< Embodiment 7 >>
f = 6.9 ~ 16.0 ~ 41.6
FNO = 4.6 ~ 5.5 ~ 5.8

| Radius of Curvature | Axial Distance | Refractive Index | Abbe Number |
|---|---|---|---|
| r1 = 33.615 | | | |
| | d1 = 0.400 | N1 = 1.84666 | ν1 = 23.82 |
| r2 = 14.109 | | | |
| | d2 = 1.840 | N2 = 1.61720 | ν2 = 54.00 |
| r3 = −59.729 | | | |
| | d3 = 0.050 | | |
| r4 = 10.291 | | | |
| | d4 = 1.200 | N3 = 1.62280 | ν3 = 56.88 |
| r5 = 25.185 | | | |
| | d5 = 0.550 ~ 5.665 ~ 9.859 | | |
| r6* = 25.185 | | | |
| | d6 = 0.300 | N4 = 1.75450 | ν4 = 51.57 |
| r7 = 2.603 | | | |
| | d7 = 1.100 | | |
| r8 = −12.769 | | | |
| | d8 = 0.240 | N5 = 1.75450 | ν5 = 51.57 |
| r9 = 9.194 | | | |
| | d9 = 0.040 | | |
| r10 = 4.737 | | | |
| | d10 = 1.050 | N6 = 1.83350 | ν6 = 21.00 |
| r11 = −163.921 | | | |
| | d11 = 0.400 | | |
| r12 = −5.633 | | | |
| | d12 = 0.250 | N7 = 1.69680 | ν7 = 56.47 |
| r13 = 73.561 | | | |
| | d13 = 2.537 ~ 1.547 ~ 0.350 | | |
| r14 = ∞ (Aperture Diaphragm S) | | | |
| | d14 = 1.100 | | |
| r15 = 5.230 | | | |
| | d15 = 1.700 | N8 = 1.51823 | ν8 = 58.96 |
| r16 = −20.825 | | | |
| | d16 = 0.050 | | |
| r17 = 5.598 | | | |
| | d17 = 1.850 | N9 = 1.51742 | ν9 = 52.15 |
| r18 = −8.354 | | | |
| | d18 = 0.450 | | |
| r19 = −4.499 | | | |
| | d19 = 0.300 | N10 = 1.84666 | ν10 = 23.82 |

TABLE 7-continued

<< Embodiment 7 >>
f = 6.9 ~ 16.0 ~ 41.6
FNO = 4.6 ~ 5.5 ~ 5.8

| Radius of Curvature | Axial Distance | Refractive Index | Abbe Number |
|---|---|---|---|
| r20 = 27.274 | | | |
| | d20 = 1.200 ~ 0.610 ~ 0.370 | | |
| r21 = 5.444 | | | |
| | d21 = 2.050 | N11 = 1.51742 | ν11 = 52.15 |
| r22 = −4.493 | | | |
| | d22 = 0.650 | | |
| r23* = −6.624 | | | |
| | d23 = 0.300 | N12 = 1.80100 | ν12 = 46.54 |
| r24* = 6.830 | | | |
| | d24 = 0.300 | | |
| r25 = 4.576 | | | |
| | d25 = 1.150 | N13 = 1.59270 | ν13 = 35.45 |
| r26 = 50.278 | | | |
| | d26 = 3.300 ~ 7.680 ~ 10.447 | | |
| r27 = ∞ | | | |
| | d27 = 4.300 | N14 = 1.51680 | ν14 = 64.20 . . . LP |
| r28 = ∞ | | | |
| | d28 = 3.200 | | |
| r29 = ∞ | | | |
| | d29 = 1.000 | N15 = 1.51680 | ν15 = 64.20 . . . CL |
| r30 = −15.385 | | | |

[Aspherical Coefficients]

r6: ε = 1.0000
A4 = 0.24608 × 10⁻³
A6 = 0.15327 × 10⁻³
A8 = −0.49879 × 10⁻⁴
A10 = 0.61788 × 10⁻⁵
A12 = −0.27828 × 10⁻⁶
r23: ε = 1.0000
A4 = −0.59350 × 10⁻²
A6 = 0.40581 × 10⁻³
A8 = −0.21348 × 10⁻³
A10 = 0.50637 × 10⁻⁵
A12 = 0.17793 × 10⁻⁵
r24: ε = 1.0000
A4 = 0.21671 × 10⁻³
A6 = 0.60883 × 10⁻³
A8 = −0.95912 × 10⁻⁴
A10 = −0.14691 × 10⁻⁵
A12 = 0.10474 × 10⁻⁵

TABLE 8

<< Actual Values of Conditions (1), (2), and (3) >>

| | Cond. (1): a/Y' | Cond. (2): \|b/a\| | Cond. (3): φC/φM |
|---|---|---|---|
| Emb. 1 | 2.42 | 1.90 | 0.438 |
| Emb. 2 [W] | 2.73 | 1.77 | 0.591 |

TABLE 9

| | Cond. (4): \|b/a\| | Cond. (5): Y'/LB | Cond. (6): φC · a_min |
|---|---|---|---|
| Emb. 3 | 1.99 | 0.360 | 0.687 |
| Emb. 4 [W] | 1.88 | 0.303 | 0.659 |
| Emb. 5 [W] | 2.96 | 0.469 | 0.887 |

<< Actual Values of Conditions (4), (5), and (6) >>

TABLE 10

| | Cond. (7): a/Y' | Cond. (8): \|b/a\| | Cond. (9): φC · φW/φT |
|---|---|---|---|
| Emb. 6 | 7.03 | 1.74 | — |
| Emb. 7 | [W]7.00 | [W]2.40 | 0.203 |

<< Actual Values of Conditions (7), (8), and (9) >>

What is claimed is:

1. An optical system for focusing an object upon an image surface of a solid-state image device, comprising:

a master optical system having positive optical power;

a filter provided between the master optical system and the image surface of the solid-state image device; and a condenser lens having positive optical power and provided between the filter and the image surface of the solid-state image device, wherein the following conditions are fulfilled:

$$\frac{a}{Y'} < 5.0$$

$$\left|\frac{b}{a}\right| < 2.0$$

where, a represents a distance between an exit pupil of the master optical system and the image surface;

b represents a distance between an exit pupil of the entire optical system and the image surface; and Y' represents a maximum image height.

2. An optical system as claimed in claim 1, wherein the following condition is fulfilled:

$$0.15 < \frac{\phi C}{\phi M} < 1.00$$

where

φC represents optical power of said condenser lens;

φM represents optical power of said master optical system.

3. An optical system as claimed in claim 1, wherein said optical system is a zoom lens system.

4. An optical system for focusing an object upon an image surface of a solid-state image device, comprising:

a master optical system having positive optical power;

a filter provided between the master optical system and the image surface of the solid-state image device; and a condenser lens having positive optical power and provided between the filter and the image surface of the solid-state image device, wherein the following condition is fulfilled:

$$1.8 < \left|\frac{b}{a}\right|$$

where, a represents a distance between an exit pupil of the master optical system and the image surface; and b represents a distance between an exit pupil of the entire optical system and the image surface.

5. An optical system as claimed in claim 4, wherein the following condition is fulfilled:

$$\frac{Y'}{LB} < 1$$

where

Y' represents a maximum image height; and

LB represents a distance between a most image side surface of said master optical system and the image surface.

6. An optical system as claimed in claim 4, wherein the following condition is fulfilled:

$$0.2 < \phi C \cdot a\ min < 1.0$$

where a min represents a distance between an exit pupil of said master optical system and the image surface; and φC represents optical power of said condenser lens.

7. An optical system as claimed in claim 4, wherein said optical system is a zoom lens system.

8. An optical system for focusing an object upon an image surface of a solid-state image device, comprising:

a master optical system having positive optical power;

a filter provided between the master optical system and the image surface of the solid-state image device; and a condenser lens having positive optical power and provided between the filter and the image surface of the solid-state image device, wherein the following condition is fulfilled:

$$6.7 < \frac{a}{Y'}$$

$$\left|\frac{b}{a}\right| < 2.0$$

where, a represents a distance between an exit pupil of the master optical system and the image surface;

b represents a distance between an exit pupil of the entire optical system and the image surface; and Y' represents a maximum image height.

9. An optical system as claimed in claim 8, wherein said optical system is a zoom lens system.

10. An optical system as claimed in claim 8, wherein the following condition is fulfilled:

$$0.01 < \phi C - \frac{\phi W}{\phi T} < 1.00$$

where

φC represents optical power of said condenser lens;

φW represents optical power of the entire optical system when said master optical system is in a shortest focal length condition; and φT represents optical power of the entire optical system when said master optical system is in a longest focal length condition.

11. An optical system for focusing an object upon an image surface of a solid-state image device, comprising:

a master optical system having positive optical power; and a condenser lens having positive optical power, said condenser lens being provided so that a distance between the condenser lens and a most image side surface of the master lens is longer than a distance between the condenser lens and the image surface of the solid-state image device, wherein the following conditions are fulfilled:

$$\frac{a}{Y'} < 5.0$$

$$\left|\frac{b}{a}\right| < 2.0$$

where, a represents a distance between an exit pupil of the master optical system and the image surface;

b represents a distance between an exit pupil of the entire optical system and the image surface; and Y' represents a maximum image height.

12. An optical system as claimed in claim 11, wherein the following condition is fulfilled:

$$0.15 < \frac{\phi C}{\phi M} < 1.00$$

where

φC represents optical power of said condenser lens;

φM represents optical power of said master optical system.

13. An optical system as claimed in claim 11, wherein said optical system is a zoom lens system.

14. An optical system for focusing an object upon an image surface of a solid-state image device, comprising:

a master optical system having positive optical power; and a condenser lens having positive optical power, said condenser lens being provided so that a distance between the condenser lens and a most image side surface of the master lens is longer than a distance between the condenser lens and the image surface of the solid-state image device, wherein the following condition is fulfilled:

$$1.8 < \left|\frac{b}{a}\right|$$

where, a represents a distance between an exit pupil of the master optical system and the image surface; and b represents a distance between an exit pupil of the entire optical system and the image surface.

15. An optical system as claimed in claim 14, wherein the following condition is fulfilled:

$$\frac{Y'}{LB} < 1$$

where

Y' represents a maximum image height; and

LB represents a distance between a most image side surface of said master optical system and the image surface.

16. An optical system as claimed in claim 14, wherein the following condition is fulfilled:

$$0.2 < \phi C \cdot a\ min < 1.0$$

where a min represents a distance between an exit pupil of said master optical system and the image surface; and φC represents optical power of said condenser lens.

17. An optical system as claimed in claim 14, wherein said optical system is a zoom lens system.

18. An optical system for focusing an object upon an image surface of a solid-state image device, comprising:

a master optical system having positive optical power; and a condenser lens having positive optical power, said condenser lens being provided so that a distance between the condenser lens and a most image side surface of the master lens is longer than a distance between the condenser lens and the image surface of the solid-state image device, wherein the following condition is fulfilled:

$$6.7 < \frac{a}{Y'}$$

$$\left|\frac{b}{a}\right| < 2.0$$

where, a represents a distance between an exit pupil of the master optical system and the image surface;

b represents a distance between an exit pupil of the entire optical system and the image surface; and Y' represents a maximum image height.

19. An optical system as claimed in claim 18, wherein said optical system is a zoom lens system.

20. An optical system as claimed in claim 18, wherein the following condition is fulfilled:

$$0.01 < \phi C - \frac{\phi W}{\phi T} < 1.00$$

where

φC represents optical power of said condenser lens;

φW represents optical power of the entire optical system when said master optical system is in a shortest focal length condition; and φT represents optical power of the entire optical system when said master optical system is in a longest focal length condition.

* * * * *